United States Patent
Kalmanek, Jr. et al.

[11] Patent Number: 6,098,188
[45] Date of Patent: Aug. 1, 2000

[54] PACKET FRAMER

[75] Inventors: Charles Robert Kalmanek, Jr., Short Hills; William Todd Marshall, Chatham, both of N.J.

[73] Assignee: Lucent Technologies Inc., Murray Hill, N.J.

[21] Appl. No.: 08/496,866

[22] Filed: Jun. 30, 1995

Related U.S. Application Data

[63] Continuation-in-part of application No. 07/836,030, Feb. 14, 1992, abandoned, which is a continuation of application No. 08/363,555, Dec. 21, 1994, abandoned, which is a continuation of application No. 07/880,878, May 11, 1992, abandoned.

[51] Int. Cl.[7] ............................. G06F 11/00; G08C 25/00
[52] U.S. Cl. ........................... 714/746; 714/758; 370/218
[58] Field of Search ..................................... 714/746, 752, 714/753–755, 758, 776; 370/216, 218, 333

[56] References Cited

U.S. PATENT DOCUMENTS

| | | | |
|---|---|---|---|
| 4,430,699 | 2/1984 | Segarra et al. | 709/230 |
| 4,750,109 | 6/1988 | Kita . | |
| 4,763,319 | 8/1988 | Rozenblit | 370/84 |
| 4,852,127 | 7/1989 | Fraser et al. | 371/34 |
| 4,975,907 | 12/1990 | Dutruel et al. | 370/85.2 |
| 5,072,449 | 12/1991 | Enns et al. | 371/37.1 |
| 5,128,945 | 7/1992 | Enns et al. | 371/37.1 |
| 5,163,054 | 11/1992 | Nagy | 371/32 |
| 5,251,215 | 10/1993 | Dradiva et al. | 370/94.1 |

FOREIGN PATENT DOCUMENTS

| | | | |
|---|---|---|---|
| 206254 | 12/1983 | Japan | H04L 1/10 |
| 63016744 | 9/1986 | Japan | H04L 11/20 |
| 6273826 | 4/1987 | Japan . | |
| 6273827 | 4/1987 | Japan . | |
| 6348030 | 2/1988 | Japan | H04L 11/20 |

OTHER PUBLICATIONS

J. E. Maxo and B. R. Saltzberg "Error–Burst Detection with Tandem CRC's", IEEE Transactions on Communications, vol. 39, No. 8, Aug. 1991, 1175–1178.

D. E. Comer Internetworking with TCP/IP, vol. I, Sections 7.3–8.8, 90–100.

Takada "An Fuddi Bridge for the High–speed Multimedia Blackbone LAN "IEEE 1990 pp. 349–404.

*Primary Examiner*—Dieu-Minh T. Le

[57] ABSTRACT

A packet of information is encapsulated into a frame and the frame is segmented into one or more cells for transmission over a communications network. One of the cells contains a sequence-identifier. When a cell is received with a non-consecutive sequence-identifier, it is determined whether or not the entire packet is contained within one cell. If the packet is not contained within one cell, the receiver discards the frame associated with the received cells. If the packet is contained within one cell, the receiver attempts to recover the packet notwithstanding the non-consecutive sequence-identifier.

6 Claims, 5 Drawing Sheets

PACKET FRAMER

REFERENCE TO PARENT APPLICATION

This is a continuation-in-part of U.S. patent application Ser. No. 7/836,030, filed Feb. 14, 1992, now abandoned.

This application is a continuation application Ser. No. 08/363,555, filed on Dec. 21, 1994 now abandoned.

This application is a continuation application Ser. No. 07/880,878, filed on May 11, 1992 now abandoned.

BACKGROUND OF THE INVENTION

1. Field of the Invention

The invention relates to communications systems in general, and, more particularly, to methods and apparatus for error control in communications systems which employ virtual circuit technology.

2. Background of the Invention

A communications system permits users to communicate over an extended distance and typically comprises a multiplicity of devices and information channels to facilitate the communication. Perhaps the most familiar and ubiquitous of all communications systems is the telephone system. This includes, for example, the local- and long-distance telephone networks, private networks and the private branch exchanges used to provide special services to businesses and institutions. While the telephone system carries information in both voice and data forms, similar computer networks carry data between computers.

FIG. 1 presents an illustrative communication system comprising a communication network 109 connecting two users, Alice 101 and Bob 103. When Alice desires to transmit information to Bob, she provides her system station 105 with the information. The system station may be any device (e.g., a telephone, facsimile machine or computer) which is capable of transforming the information a user provides to a form the communication system can handle, and vice versa. When the system station is an analog telephone, the system station transforms the acoustic vibrations of Alice's voice into an ordered set of signals representing analog quantities ("analog signals") for transmission over the communication system. When the system station is a digital telephone, facsimile machine or computer, the system station typically transforms the information into an ordered set of signals or "packet" representing a set of digital quantities ("digital signals").

After the system station 105 creates the set of signals, the system station transmits the signals, over a communication network 109, to Bob's system station 107 where Bob's system station transforms the signal into a form that is suitable for presentation to Bob.

A typical packet switching system is disclosed in U.S. Pat. Re. 31,319, by A. G. Fraser, reissued Jul. 19, 1983, and enabled communications systems to carry packets. Such packet-switched communications systems are well known in the prior art, carry both voice and non-voice data and generally are more economical and utile than their analog counterparts.

A packet-switched communication system can destroy a packet either by corrupting (i.e., changing the signals in) it or by losing all or a portion of the signals in it. A packet retains its "integrity" when it is delivered with no changed or lost signals. When a packet is destroyed during transmission, however, it becomes impossible to determine the integrity of the packet. Although merely determining whether a packet has been destroyed is problematic, once it is determined that the packet has been destroyed, the generally accepted procedure is to discard the packet and request retransmission by the sender. This is the practice followed by the TCP/IP protocol suite and such other well-known communications protocols as LAP/LAPB/LAPD, X.25/X.75 and Q.921/Q.931.

To determine whether a packet has been destroyed it is necessary to make certain assumptions about how the packet can be destroyed. Assuming that the signals within a packet may be changed but never lost, a Cyclic-Redundancy-Check will determine whether the integrity of the packet has been destroyed or not. These are the assumptions and the solution for many data networks (e.g., X.25, Ethernet, FDDI and Bisync).

Assuming that the signals within the packet can be lost but not changed, a packet length indicator and a packet sequence identifier will determine whether the integrity of the packet has been destroyed or not. This is the assumption and the solution used in Datakit networks marketed by AT&T, as implemented in the Universal Receiver Protocol disclosed in Fraser et al, U.S. Pat. No. 4,852,127, issued Jul. 25, 1989.

Packet-switching networks which employ "virtual circuit" technology allocate network resources such that all of the information sent across the network is sent successively in the order that the information is submitted to the network. Such virtual circuit packet-switching networks are well-known in the prior art, generally carry non-voice data and are more utile than their datagram counterparts.

Virtual circuit packet-switching networks can both lose signals within a packet and can corrupt the remainder. Therefore, it is not advisable to make any of the simplifying assumptions made for networks above. Thus, it has been problematic to devise a mechanism for determining whether the integrity of a packet has been destroyed or not in virtual circuits. Merely combining the mechanisms of a Cyclic-Redundancy-Check, a packet length indicator and a packet sequence identifier is insufficient.

SUMMARY OF THE INVENTION

The present invention avoids the failings of the prior art while providing a mechanism for detecting both the destruction and corruption of an ordered set of signals transmitted over a lossy communication channel. These results are obtained in an illustrative embodiment of the present invention which receives as input an ordered set of signals to be communicated and augments the set of signals with error detection and other control signals. All of these signals are then segmented into at least one set of output signals such that some of the error detection signals and the accounting signals are contained within a single set of output signals. Embodiments of the present invention are more efficient (i.e., have less overhead) than solutions in the prior art and are more easily implemented.

DETAILED DESCRIPTION

1. Introduction

For pedagogical reasons, illustrative embodiments of the present invention are presented in the context that one user, Alice, desires to reliably transmit a voice or non-voice data message to a second user, Bob, over a communication system which employs virtual circuit technology. While an attempt is made by the virtual circuit to assure the validity of the packet, in fact, the packet either may be either corrupted or not delivered at all.

It should be noted, however, that a salient characteristic of virtual circuit technology is that while the virtual circuit may either corrupt the packet, deliver only parts of it, or not deliver it at all, those parts that are delivered are delivered in the order sent. This is because the same physical (or logical) path is typically used for all of the signals in the packet. A feature of the illustrative embodiment advantageously provides a mechanism for detecting the corruption or deletion of the packet, or parts of the packet. Error correction, usually in the form of requests for packet retransmission, are advantageously not handled by the embodiment but are left to Bob (that is, the embodiment of the present invention is used in conjunction with standard error correction techniques to fully accomplish high accuracy data communications).

Attached as Appendices 1 and 2 are listings of illustrative computer programs written in the well-known C language corresponding to the functions described below. When executed on any one of a large class of general purpose computers, these programs will realized hardware embodiments of the present invention. Appendices 3 and 4 are tables of data which are used by the computer programs listed in Appendices 1 and 2. Appendix 5 is a listing of a computer program which generated the tables in Appendices 3 and 4.

In the following, each reference to a "byte" refers to an 8-bit byte. It will be clear to those of ordinary skill in the data communications field how to modify the illustrative embodiments to operate on other than 8-bit bytes.

2. An Apparatus for Framing a Packet

Figure 1:
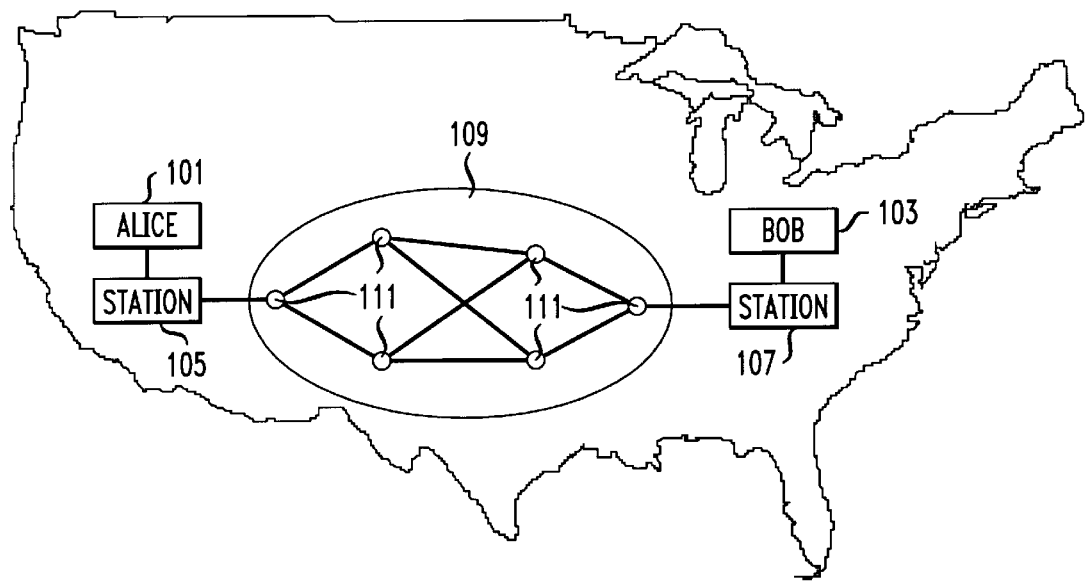
FIG. 1 presents a map of an illustrative communications network which provides communications facilities between two parties.
Figure 2:
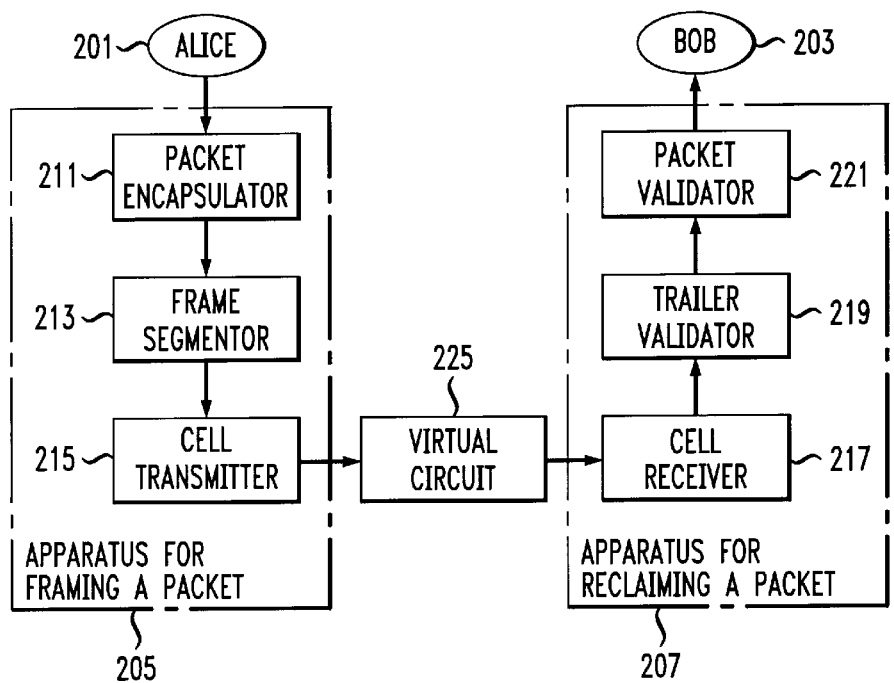
FIG. 2 presents an illustrative embodiment of the present invention which provides-error detection in a communications system.

As shown at 205 in FIG. 2, an illustrative embodiment of the present invention advantageously comprises three modules: (1) a packet encapsulator 211 for encapsulating the packet to create a "frame", (2) a frame segmentor 213 for segmenting the frame into one or more "cells", and (3) a cell transmitter 215 for transmitting to Bob the cell or cells over the virtual circuit 225. For pedagogical reasons each module is described below in terms of the functionality that it provides. It will be clear to those of ordinary skill in the data communications field how to fabricate each module with either special purpose hardware or with appropriately programmed general purpose hardware. It is preferred that the illustrative embodiment be constructed with either electrical, optical or electro-optical technologies. It will be clear to those of ordinary skill how these technologies may advantageously be used to practice the instant invention or so much of it as is of use. In particular, systems of the type described in the above referenced U.S. Pat. No. Re. 31,319, will be found by those skilled in the art to be readily adaptable for embodiments of the present invention.

The embodiment in FIG. 2 receives as input from Alice 201 an ordered set of signals called a "packet." The packet is the user input to the embodiment and may be thought of as the data payload. There are no restrictions on the contents or the structure of the data in the packet and it may advantageously have any length (but lengths of between zero and 65,535 ($2^{16}-1$) bytes are preferred for this particular embodiment).

Figure 3:
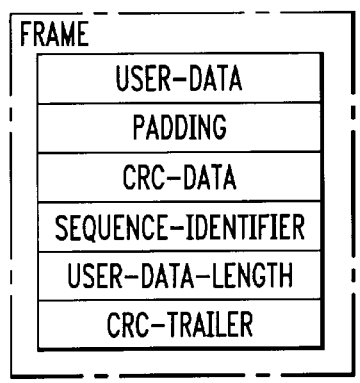
FIG. 3 presents the format of an illustrative frame containing user-data and other accounting information.

The first module 211 in the embodiment encapsulates the packet to create an augmented set of ordered signals known as a "frame." As shown in FIG. 3, a frame is a variable-length set of signals that advantageously comprises, in order, the following six fields: (1) a "user-data" field, (2) a "padding" field, (3) a "CRC-data" field, (4) a "sequence-identifier" field, (5) a "user-data-length" filed and (6) a "CRC-trailer" field.

Figure 4:
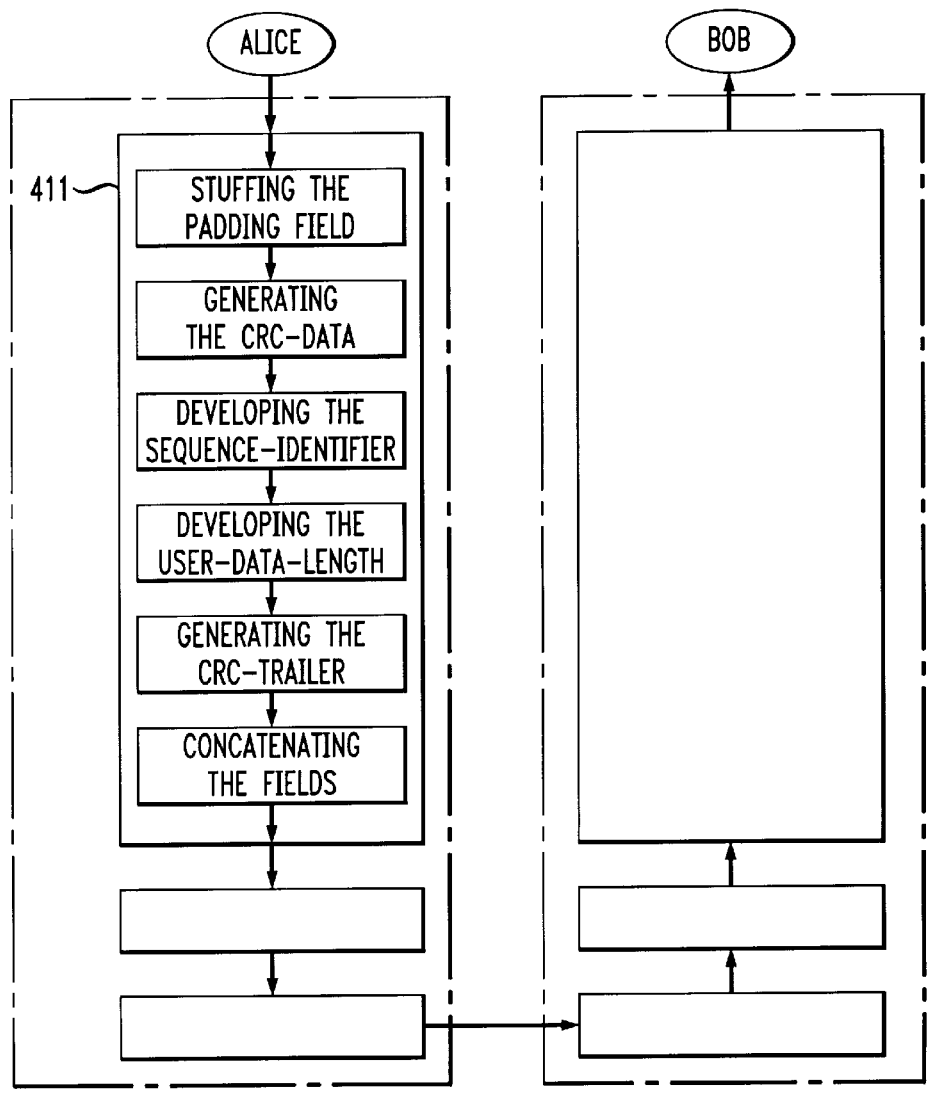
FIG. 4 depicts the functionality provided by the packet encapsulator module shown in FIG. 2.

As shown at 411 in FIG. 4, the module for encapsulating the packet advantageously performs at least six steps: (1) stuffing the padding field, (2) generating the CRC checksum for the CRC-data field, (3) developing a sequence-identifier for the sequence-identifier field (4) developing the length of the user-data field to store in the user-data-length field, (5) generating the CRC checksum for the CRC-trailer field, and (6) concatenating the user-data field, the padding field, the CRC-data field, the sequence-identifier field, the user-data-length field and the CRC-trailer field, in order, to create the frame. It should be understood that the order of the fields within a frame is not critical and the described embodiment may be readily modified to accommodate variations in the order of the fields in the frame.

The user-data field advantageously includes the packet (i.e., the message that Alice desires to convey to Bob). The information in the packet is advantageously put into the user-data field without translation, modification, or adjustment and, therefore, there is a one-to-one correspondence between the information in the packet and the information in the user-data field. Because the packet may have an arbitrary length of up to 65,535 bytes, so may the user-data field.

The padding field is "stuffed" or filled out with between zero and seven bytes of arbitrary data so that the overall length of the frame is forced to a multiple of 8 bytes. That the preferred frame length is chosen to be a multiple of 8 bytes arises from (1) the fact that, in this embodiment, the "trailer" (i.e., the sequence-identifier field, the user-data-length field and the CRC-trailer field) is, in toto, 8 bytes long, and (2) the general requirement that the frame be segmented such that the trailer be contained within a single cell as will be described more fully below. Therefore, when the length of a cell and the length of the frame are both multiples of the length of the trailer, it is assured that the frame will always be properly segmented. It should be clear to those skilled in the data communications field how to modify the range of bytes in the padding field to accommodate desired modifications to the embodiment.

In this embodiment, the length of the padding field (i.e., the number of arbitrary data bytes stuffed into the padding field) is advantageously a function of the length of the user-data, n, and may be determined as follows:

length of padding field=(65,540−n) mod 8

Where "(65,540−n) mod 8" means the remainder when the quantity (65540−n) is divided by 8. For example, when the user-data is 14,386 bytes long, the padding field is to be 2 bytes long.

The CRC-data field is advantageously four bytes long and contains an error detection string that enables the detection of transmission errors in the user-data field and padding fields. Specifically, the data in the CRC-data field is advantageously the generated Cyclic-Redundancy-Code checksum resulting from applying the generator polynomial:

$$g(x)=x^{32}+x^{31}+x^{4}+x^{3}+x+1$$

to the data within both the user-data and padding fields. Although the Cyclic-Redundancy-Code is the preferred error detection mechanism, it will be clear to those skilled in the art how to substitute another error detection mechanism for the Cyclic-Redundancy-Code mechanism.

The sequence-identifier field is typically three bytes long and contains an identifier of the input sequence or packet. The sequence-identifier is used to identify each frame transmitted between a given transmitter (e.g., Alice) and a given receiver (e.g. Bob). Thus, each transmitter (receiver) must maintain a "synchronized" (i.e., the records of the both the transmitter and the receiver should be the same) record of the sequence-identifier last transmitted (received) to (from) a given receiver (transmitter). In other words, when Alice transmits packets to Bob, Carol and David, Alice and Bob must maintain one synchronized sequence-identifier, Alice and Carol must maintain a second synchronized sequence-identifier and Alice and David must maintain a third synchronized sequence-identifier.

When a transmitter has not previously transmitted a frame to a given receiver, the sequence-identifier for the Transmitter-Receiver pair is advantageously initialized at zero. Subsequently, the sequence-identifier for the Transmitter-Receiver pair is incremented by one (mod $2^{24}$) for every frame that is transmitted from the Transmitter to the Receiver. The sequence-identifier for a frame is not re-used when the frame is retransmitted; rather, the next regular sequence-identifier is used.

The user-data-length field is advantageously two bytes long and represents the length, in bytes, of the user-data field. The CRC-trailer field is advantageously three bytes long and contains an error detection string that enables Bob to detect transmission errors in the trailer. Specifically, the data in the CRC-trailer field is advantageously determined (1) by generating a Cyclic-Redundancy-Code checksum ("CRC") resulting from applying the generator polynomial:

$$g(x)=x^{23}+x^{22}+x^{2}+1$$

to the data within both the sequence-identifier field and the user-data-length fields, (2) by multiplying the CRC by two and (3) by bit-wise Exclusive-ORing the product by C00005 (hexadecimal). The modification of the CRC in steps (2) and (3) assures that the checksum is 24 bits in length (three bytes) and always has a non-zero value. Steps (2) and (3) can alternately be represented by the statement (CRC<<1)^0x C00005. Although this is the preferred error detection mechanism, it will be clear to those of ordinary skill in the data communications field how to substitute another error detection mechanism for the Cyclic-Redundancy-Code mechanism.

The second module 213 in FIG. 2 segments the frame into one or more cells. In this embodiment, all cells are, e.g., 48 bytes long. It will be clear to those of ordinary skill in the data communications field how to modify the embodiment to accommodate other particular cell lengths useful in other applications.

Figure 5:
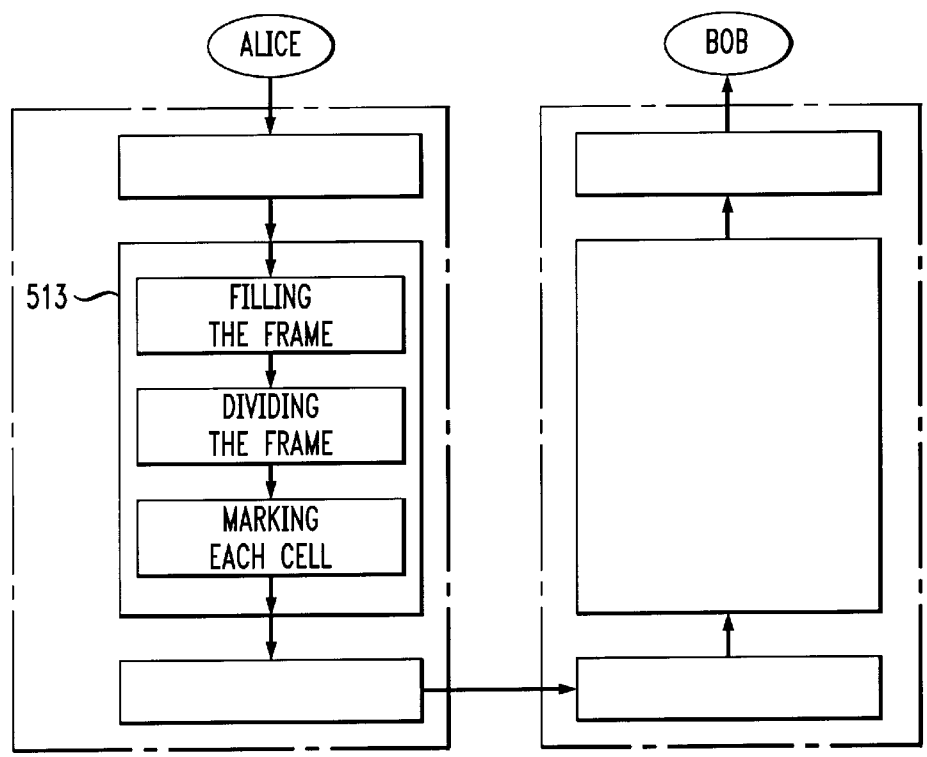
FIG. 5 depicts the functionality provided by the frame segmentor module shown in FIG. 2.

As shown at 513 in FIG. 5, the second module 213 of FIG. 2 in the embodiment advantageously performs at least these steps in segmenting the frame into one or more cells: (1) filling the frame, if necessary, (2) dividing the frame into cells, and (3) marking each cell as either a "user-data cell" or as a "trailer cell".

When the frame length is not a multiple of 48 bytes, the frame must have appended to it one or more "fill bytes" to make the total length of the frame a multiple of 48. The fill bytes have a zero value (i.e., typically are filled with all zeroes).

The steps of dividing the frame into one or more cells begins by numbering the bytes in the frame from 1 to n beginning with the first byte in the user-data field and ending with the last fill byte. The first 48 bytes are assigned to the first cell. The next 48 bytes are assigned to the second cell and so forth until the entire frame has been divided into one or more cells.

The final step in segmenting the frame involves marking each cell to indicate whether it is a "user-data cell" or a "trailer cell". Each cell which does not contain the trailer is marked as a user-data cell while the last cell of a frame (which does contain the trailer) is marked as the "trailer cell".

The final module 215 in the embodiment transmits the marked cells, in order, over the virtual circuit.

3. An Apparatus for Reclaiming a Packet

As shown at 207 in FIG. 2, a receiver or packet reclaiming system in accordance with an illustrative embodiment of the present invention advantageously comprises three modules: (1) a cell receiver 217 for receiving one or more cells from the virtual circuit 225 to create a "candidate frame", (2) a trailer validator 219 for validating the integrity of the trailer, and (3) a packet validator 221 for validating the integrity of the packet. For pedagogical reasons each module is described below in terms of the functionality that it provides. It will be clear to persons of ordinary skill in the data communications field how to fabricate each module with either special purpose hardware or with appropriately programmed general purpose hardware. It is preferred that the illustrative embodiment be constructed with either electrical, optical or electro-optical technologies. It will be clear to persons of ordinary skill how to practice the instant invention or so much of it as is of use.

The first module 217 in the embodiment advantageously receives and accumulates one or more cells from the virtual circuit until a trailer cell is received. When a trailer cell is received, the trailer cell and all (if any) of the user-data cells accumulated since the receipt of the last trailer cell are assembled, in the order received, into a "candidate frame".

Figure 6:
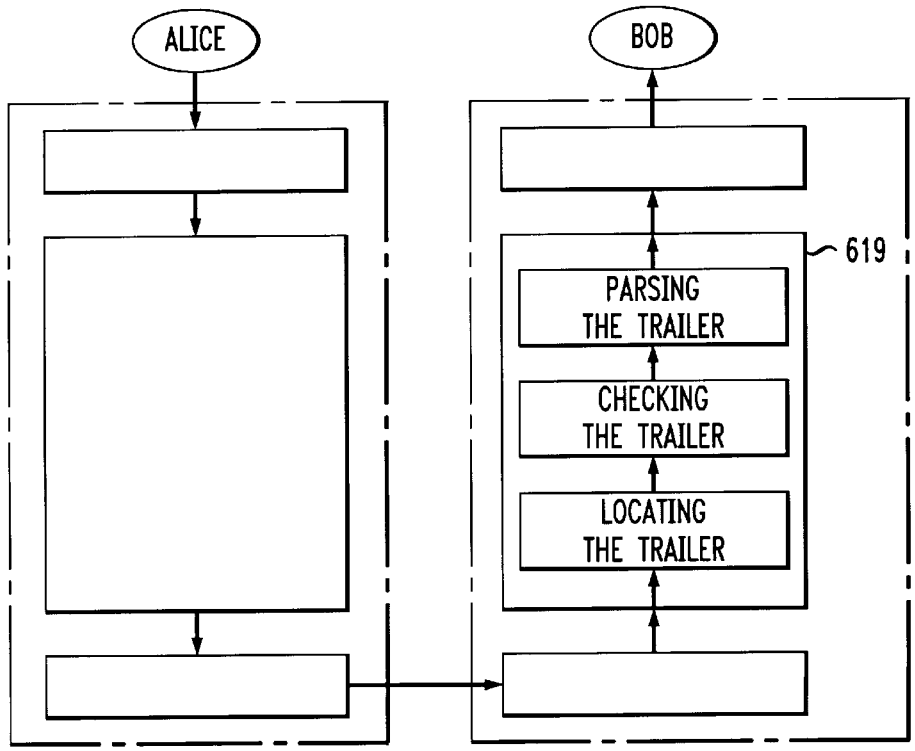
FIG. 6 depicts the functionality provided by the trailer validator module shown in FIG. 2.

The second module 219 in FIG. 2 in the embodiment advantageously validates the integrity of the trailer. As shown at 619 in FIG. 6, validating the integrity of the trailer advantageously comprises three operations: (1) locating the trailer within the candidate frame, (2) checking the trailer for transmission errors and (3) parsing the trailer.

The second module locates the trailer within the candidate cell by advantageously scanning the trailer cell in eight byte steps beginning from the end of the cell forward to the front of the cell until a non-zero byte is found. Since the last byte of data in the CRC-trailer was advantageously modified, during the framing process, to be always non-zero, this non-zero byte serves as a delimiter for finding the end of the trailer.

When no non-zero byte is found within the last 41 bytes of the cell, a transmission error has occurred. In such a case, the candidate frame is discarded, the process of reclaiming the packet is terminated, and a message is transmitted to Bob indicating that an error has occurred in the transmission of a packet from Alice.

When the trailer is located, the second module checks the trailer for transmission errors by feeding the signals within trailer (i.e., the user-data-length, the sequence-identifier and the CRC-trailer fields) into a Cyclic-Redundancy-Code mechanism with the same generator polynomial used for generating the data within the CRC-trailer field.

When the result of the Cyclic-Redundancy-Code check indicates that the data within the trailer is corrupted, the candidate frame is discarded, the process of reclaiming the packet is terminated and a message is transmitted to Bob indicating that an error has occurred.

When the integrity of the trailer is validated, the second module parses the trailer. The trailer is advantageously eight bytes long and is parsed as follows: the first three bytes of the trailer contain the sequence-identifier and the next two bytes contain the user-data-length field.

Figure 7:
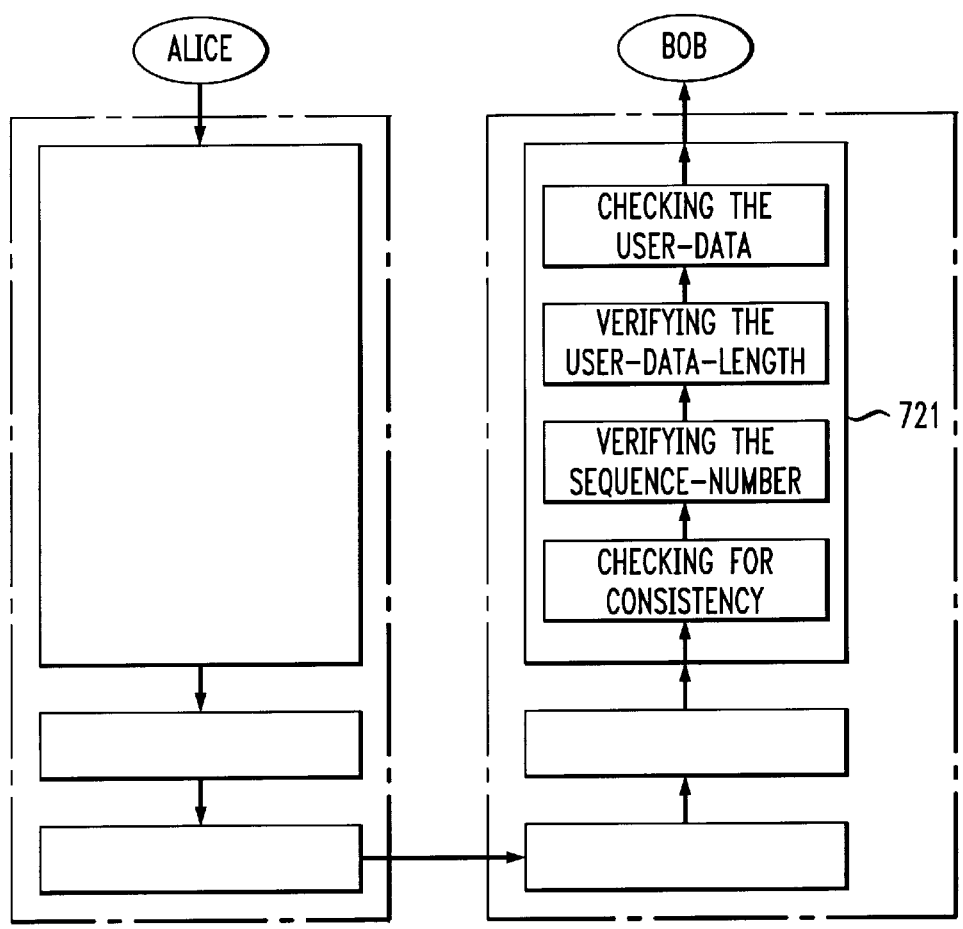
FIG. 7 depicts the functionality provided by the packet validator module shown in FIG. 2.

The third module 221 in the embodiment validates the integrity of the packet (i.e., the user-data within the user-data field). As shown at 721 in FIG. 7, the operation of checking the integrity of the user-data advantageously comprises four steps: (1) checking the consistency of the user-data-length and the number of data cells in candidate frame, (2) verifying the sequence-identifier, (3) verifying the user-data-length, and (4) checking the integrity of the user-data.

When the value of the user-data-length field is 36 or less (meaning that the candidate frame fits within one cell), the data cells within the candidate frame are discarded and the candidate frame is, from this point forward in the reclaiming process, considered to contain only the trailer cell.

The third module in the embodiment advantageously checks the candidate frame's sequence-identifier against Bob's record of the previous frame's sequence-identifier to assure that the candidate frame's sequence-identifier is one more (mod $2^{24}$) than that of the previous frame. Regardless of the result, Bob's record of the previous frame's sequence-identifier is updated with the candidate frame's sequence-identifier. When, however, the candidate frame's sequence number is out of sequence and the user-data-length is 37 or more, the candidate frame is discarded, the process of reclaiming the packet is terminated and a message is transmitted to Bob indicating that an error has occurred.

Next, the user-data-length is checked to assure that it is less than or equal to the total number of bytes in the candidate frame's user-data and padding fields. When the condition is not satisfied, the candidate frame is discarded, the process of reclaiming the packet is terminated, and a message is transmitted to Bob indicating that an error has occurred. Otherwise, the user-data-length is used to parse the user-data from the padding.

The user-data is checked for transmission error by feeding the user-data and the padding signals and the CRC-data into a Cyclic-Redundancy-Code mechanism with the generator polynomial used for generating the data within the CRC-data field. When the result of the Cyclic-Redundancy-Code mechanism indicates that the user-data and the padding are corrupted, the candidate frame is discarded, the process of reclaiming the packet is terminated and a message is transmitted to Bob indicating that an error has occurred. Otherwise, the user-data has been received, complete and uncorrupted and is thereafter considered the original packet which is transmitted to Bob 203.

4. An Alternate Apparatus for Reclaiming a Packet

This section presents an apparatus for reclaiming a packet which apparatus is an alternative to that presented in Section 3. This apparatus utilizes the procedure disclosed in the program listing in Appendix I.

As shown at 207 in FIG. 2, a receiver or packet reclaiming system in accordance with an illustrative embodiment of the present invention advantageously comprises three modules: (1) a cell receiver 217 for receiving one or more cells from the virtual circuit 225 to create a "candidate frame", (2) a trailer validator 219 for validating the integrity of the trailer, and (3) a packet validator 221 for validating the integrity of the packet. For pedagogical reasons each module is described below in terms of the functionality that it provides. It will be clear to those of ordinary skill in the data communications field how to fabricate each module with either special purpose hardware or with appropriately programmed general purpose hardware. It is preferred that the illustrative embodiment be constructed with either electrical, optical or electro-optical technologies. It will be clear to those of ordinary skill how to practice the instant invention or so much of it as is of use.

The first module 217 in the embodiment advantageously receives and accumulates one or more cells from the virtual circuit until a trailer cell is received. When a trailer cell is received, the trailer cell and all (if any) of the user-data cells accumulated since the receipt of the last trailer cell are assembled, in the order received, into a "candidate frame". The first module hands the candidate frame to the second module 219.

The second module 219 in FIG. 2 in the embodiment advantageously validates the integrity of the trailer. As shown at 619 in FIG. 6, validating the integrity of the trailer advantageously comprises three operations: (1) locating the trailer within the candidate frame, (2) checking the trailer for transmission errors and (3) parsing the trailer.

The second module 619 advantageously locates the trailer within the candidate frame by scanning the trailer cell in eight byte steps beginning from the end of the trailer cell forward to the front of the trailer cell until a non-zero byte is found. See the trailer cell format examples in Sections 5.1 and 5.2, infra. Since the last byte of data in the CRC-trailer was advantageously modified, during the framing process, to be always non-zero, this non-zero byte serves as a delimiter for finding the end of the trailer within the trailer cell.

When no non-zero byte is found within the last 41 bytes of the cell, a transmission error is deemed to have occurred. The number 41 is derived from the length, in bytes, of the cell (48), minus the length, in bytes, of the trailer (8), plus 1. It will be clear to those of ordinary skill in the art how to modify this test to accommodate variations in the length of the cell and/or trailer. When a transmission error is deemed to have occurred second module 619 discards the candidate frame, aborts reclamation of the packet, and transmits a message to Bob indicating that an error has occurred in the transmission of one or more packets from Alice.

After the trailer has been located, second module 619 checks the trailer for transmission errors by feeding the signals within trailer (i.e., the user-data-length, the sequence-identifier and the CRC-trailer fields) into a Cyclic-Redundancy-Code mechanism with the same generator polynomial used for generating the data within the CRC-trailer field.

When the result of the Cyclic-Redundancy-Code check indicates that the data within the trailer is corrupt, second module 619 discards the candidate frame, aborts reclamation of the packet, and transmits a message to Bob indicating that an error has occurred in the transmission of one or more packets from Alice.

When the result of the Cyclic-Redundancy-Code check indicates that the data within the trailer is not corrupt, second module 619 parses the trailer into (1) the sequence-identifier, (2) the user-data-length, and (3) the CRC-trailer. As stated in Section 2, the trailer is advantageously eight bytes long. The trailer is parsed as follows: the first three bytes of the trailer represent the sequence-identifier, the next two bytes represent the user-data-length field, and the last three bytes represent the CRC-trailer. Second module 619 passes the candidate frame, the sequence-identifier and the user-data-length to third module 221.

Third module 221 validates the integrity of the packet (i.e., the user-data within the user-data field). As shown at 821 in FIG. 8, the operation of checking the integrity of the user-data advantageously begins by checking whether the integer value within the sequence-identifier field is one more (mod $2^{24}$) than the last sequence-identifier sent by Alice. This check permits Bob to determine whether any trailer cells have been lost since the receipt of the last trailer cell from Alice.

Figure 8:
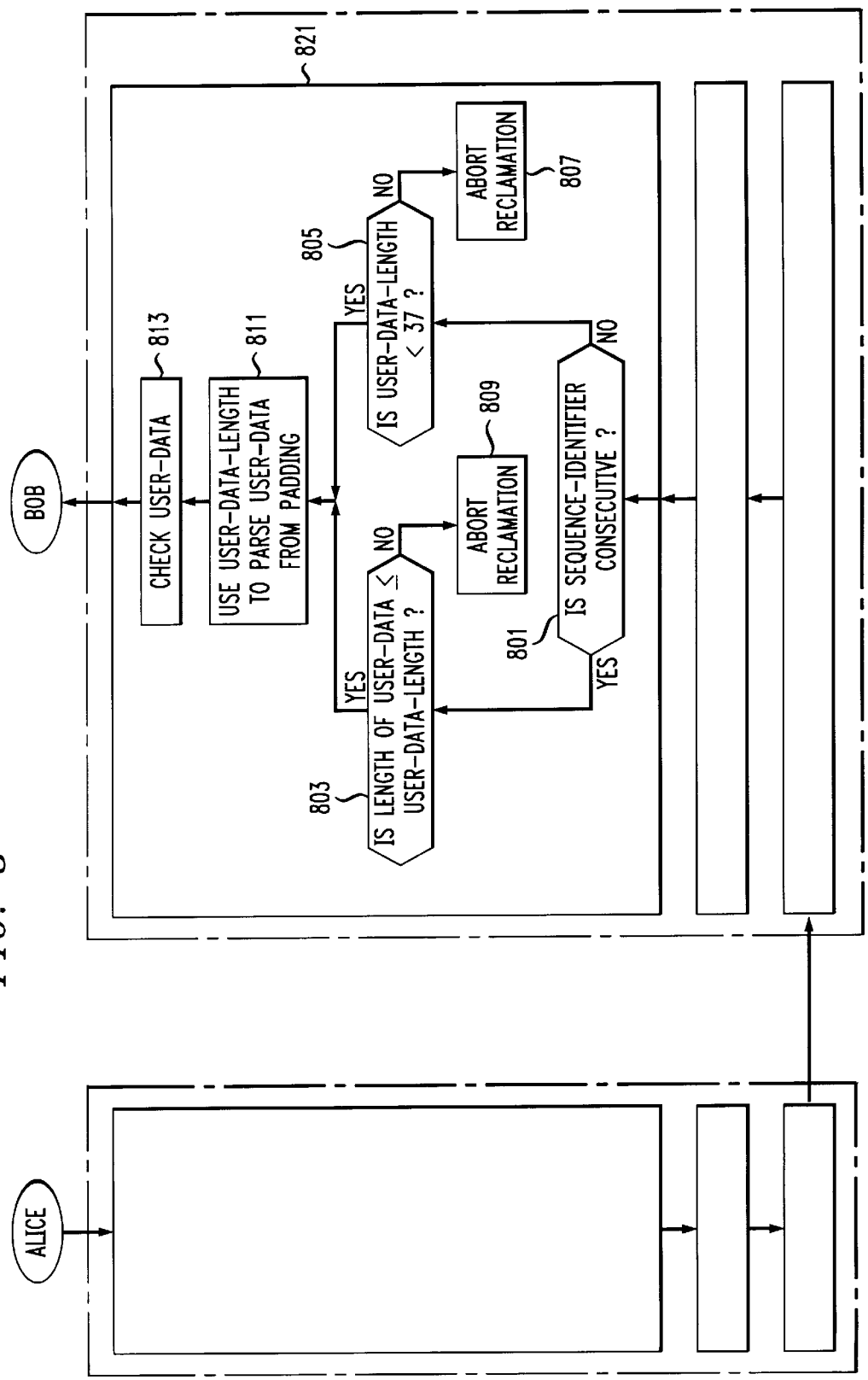
FIG. 8 depicts the functionality provided by alternate pack validator module shown in FIG. 7.

When, as shown at 801 and 803 in FIG. 8, third module 221 determines that the sequence-identifier is the one expected (and, therefore, that there have been no lost packets in the interim), third module 221 (1) records the instant sequence-identifier (and thus replacing the record of the last received sequence-identifier) and (2) checks to determine that the user-data-length is less than or equal to the number of bytes in the candidate frame's user-data and padding fields. When this test yields a negative answer (meaning that some or all of the data cells associated with the instant trailer cell have been lost), the candidate frame is deemed corrupt and is discarded, the process of reclaiming the packet is terminated and a message is transmitted to Bob indicating that a transmission error has occurred. When the test comparing the user-data-length to the number of bytes in the user-data and padding fields yields an affirmative answer (meaning that all of the data cells associated with the instant trailer cell appear to have been received), third module 221, at 811 in FIG. 8, uses the user-data-length to parse the user-data from the padding and passes them both to the CRC-Data checking operation at 813.

When, as shown at 801 and 803 in FIG. 8, third module 221 determines that the sequence-identifier is not consecutive or one more (mod $2^{24}$) than expected (meaning that one or more trailer cells have been lost since the receipt of the last trailer cell), third module 221 records the instant sequence-identifier (and thus replacing the record of the last received sequence-identifier) despite the discontinuity, because such recordation has the effect of resynchronizing Alice's and Bob's respective sequence-identifier records.

Upon detecting the sequence-identifier discontinuity, third module 221, at 805, attempts to salvage, under certain circumstances, the user-data associated with the instant trailer cell despite evidence that, at some point since receipt of the last valid packet, one or more cells have been lost in transmission. When the user-data associated with the instant trailer is wholly contained within the instant trailer cell, it may be possible to salvage the user-data.

To do this, third module 221, at 805, tests whether the user-data-length is less than 37 (i.e., if the user-data associated with the instant trailer could fit in the remainder of the cell not occupied by the trailer). The number 37 is derived from the length, in bytes, of a cell (48) minus the length, in bytes, of the trailer (8) minus the length, in bytes, of the CRC-Data field (2) plus 1. It will clear to those having ordinary skill in the art how to modify this test to accommodate variations in any of the cell length, the trailer length or the length of the CRC-Data field. When this test yields a negative answer, (meaning that some or all of the data cells associated with the instant trailer cell have been lost) the candidate frame is deemed corrupt and is discarded, the process of reclaiming the packet is terminated and a message is transmitted to Bob indicating that a transmission error has occurred.

When the test comparing the user-data-length to 37 yields an affirmative answer (meaning that the user-data is wholly within the trailer cell), the third module, at 811, uses the user-data-length to parse the user-data from the padding and passes them both to the CRC-Data checking operation at 813.

The user-data is checked for transmission errors by feeding the user-data and the padding signals and the CRC-data into a Cyclic-Redundancy-Code mechanism with the generator polynomial used for generating the data within the CRC-data field. When the result of the Cyclic-Redundancy-Code mechanism indicates that the user-data and the padding are corrupt, the candidate frame is deemed corrupt and is discarded, the process of reclaiming the packet is terminated and a message is transmitted to Bob indicating that a transmission error has occurred. Otherwise, the user-data is deemed received, complete and uncorrupted, and is transmitted to Bob 203.

5. Examples
5.1 A Packet Which Fits Into a Single Cell

A sample frame containing the packet "Hello world<CR><LF>" (13 bytes) appears in Table 1.

TABLE 1

| 48 | 65 | 6C | 6C | user-data "Hell" |
|----|----|----|----|----|
| 6F | 20 | 77 | 6F | user-data "o wo" |
| 72 | 6C | 64 | 0D | user-data "rld<CR>" |
| 0A | 00 | 00 | 00 | user-data "<LF>"; 3 padding bytes |
| 00 | 00 | 00 | 00 | 4 additional padding bytes |
| 4C | 0C | 60 | C9 | CRC-data=4C0C60C9 |
| 12 | 34 | 56 | 00 | sequence-number=123456 |
| 0D | 2D | AE | 0D | user-data-length=13; CRC-trailer=2DAE0D |
| 00 | 00 | 00 | 00 | 16 fill bytes |
| 00 | 00 | 00 | 00 | |
| 00 | 00 | 00 | 00 | |

TABLE 1-continued

| 00 | 00 | 00 | 00 |

5.2. A Packet Which Requires Multiple Cells

A sample frame containing the packet "The fault, dear Brutus, is not in our stars, <CR><LF> But in ourselves . . . <CR><LF>" (67 bytes) appears in Table 2.

TABLE 2

| 54 | 68 | 65 | 20 | user-data "The" |
|---|---|---|---|---|
| 66 | 68 | 65 | 20 | user-data "faul" |
| 74 | 2C | 20 | 64 | user-data "t,d" |
| 65 | 61 | 72 | 20 | user-data "ear" |
| 42 | 72 | 75 | 74 | user-data "Brut" |
| 75 | 73 | 2C | 20 | user-data "us," |
| 69 | 73 | 20 | 6E | user-data "is n" |
| 6F | 74 | 20 | 69 | user-data "ot i" |
| 6E | 20 | 6F | 75 | user-data "n ou" |
| 72 | 20 | 73 | 74 | user-data "r st" |
| 61 | 72 | 73 | 2C | user-data "ars," |
| 0D | 0A | 42 | 75 | user-data "<CR><LF>Bu" |
| 74 | 20 | 69 | 6E | user-data "t in" |
| 20 | 6F | 75 | 72 | user-data "our" |
| 73 | 65 | 6C | 76 | user-data "selv" |
| 65 | 73 | 2E | 2E | user-data "es.." |
| 2E | 0D | 0A | 00 | user-data ".<CR><LF>"; 1 padding byte |
| 37 | C7 | 99 | E0 | CRC-data=37C799E0 |
| 00 | 4E | 21 | 00 | sequence-number=200001 |
| 43 | 4C | 14 | 7D | user-data-length=67; CRC-trailer=4C147D |
| 00 | 00 | 00 | 00 | 16 fill bytes |
| 00 | 00 | 00 | 00 | |
| 00 | 00 | 00 | 00 | |
| 00 | 00 | 00 | 00 | |

APPENDIX I

C Implementation of Receiver Procedures
Following is a C Program that when run on a general purpose computer implements an apparatus for framing a packet. This routine is expected to be called every time a control (type=2) cell is received and determines the validity of the frame. It returns the length of good user-data received, or −1 if the frame contains an error.

```
frame_check(seqptr, buf, len)
register char *buf;
register int len;
register int *seqptr;
{
register int i;
register char *cp;
register long crc;
long seqno, expseq;
int userlen, padding;
    if ((len&03) !=0)
        return (-1);    /* frame must be multiple of 8 bytes in length */
/*
 * 1. find trailer. depend on bit0 of crc being non-zero
 */
    cp = &buf[len];
    while (cp[-1] == 0 && len>0) {
        cp -= 4;
        len -= 4;
    }
    cp -= 8;
    if (len < 8)
        return (-1);           /* frame too small */
    len -= 8;
/*
 * 2. check CRC in trailer
 */
    crc = 0;
    for (i=0; i<8; i++) {
        crc = crc_trail[((crc>>(SIZE_CRCTRAIL-8))^(cp[i])) & 0xff]
              ^((crc<<8)&MASK_CRCTRAIL);
```

APPENDIX I-continued

C Implementation of Receiver Procedures
Following is a C Program that when run on a general purpose computer implements an apparatus for framing a packet. This routine is expected to be called every time a control (type=2) cell is received and determines the validity of the frame. It returns the length of good user-data received, or −1 if the frame contains an error.

```
    }
    if (crc != 0)
        return (-1);           /* bit corruption error in trailer */
/*
 * 3. check sequence number of this frame
 *       possibly adjust buffer if seq bad and userdatalength <= 36
 *       this covers the case of a dropped control cell
 *       followed by a short message
 */
    seqno = ((cp[0]&0xff)<<16) + ((cp[1]&0xff)<<8) + (cp[2]&0xff);
    expseq = (*seqptr+1)&0xffffff;
    userlen = ((cp[3]&0xff)<<8) + (cp[4]&0xff);
    if (seqno != expseq) {
        if (userlen > 36) {
            *seqptr = seqno;
            return (-1);       /* missing complete frame, not recoverable */
        }
        len = (len % 48);      /* keep only last cell */
        cp -= len;             /* point at start of last cell */
        for (i=0; i<len; i++)
            buf[i] = *cp++;
    }
    *seqptr = seqno;
/*
 * 4. check length of frame
 */
    if (len != ((userlen + 11) & 0xfffffff8))
        return (-1);           /* wrong length frame */
/*
 * 5. check CRC over data
 */
    crc = 0;
    cp = buf;
    for (i=0; i<len; i++) {
        crc = crc_data[((crc>>(SIZE_CRCDATA-8))^(*cp++)) & 0xff]
              ^((crc<<8)&MASK_CRCDATA);
    }
    if (crc != 0)
        return (-1);           /* CRC over data incorrect */
/*
 * all OK
 */
    return (userlen);
}
```

APPENDIX II

C Implementation of Transmitter Procedures
Following is a C Program that when run on a general purpose computer implements an apparatus for reclaiming a packet. This routine expects to be called before each frame is sent, and appends the proper control information to the tail of the buffer. The length of the resultant message is returned.

```
frame_gen(infoptr, buf, len)
register char *buf;
struct frame info *infoptr;
{
register char *cp;
register long i, crc;
    infoptr -> xseq + = 1;
    cp = buf; crc = 0;
/*
 * 1. user data
 */
    for (i=len; i>0; i--) {
        crc = crc_data[((crc>>(SIZE_CRCDATA-8))^*cp++) & 0xff]
              ^((crc<<8)&MASK_CRCDATA);
    }
```

APPENDIX II-continued

C Implementation of Transmitter Procedures

Following is a C Program that when run on a general purpose computer implements an apparatus for reclaiming a packet. This routine expects to be called before each frame is sent, and appends the proper control information to the tail of the buffer. The length of the resultant message is returned.

```
/*
 * 2. padding for alignment
 */
    for (i=(8-((len+4)&7))&7; i>0; i--) {
        crc = crc_data[((crc>>(SIZE_CRCDATA-8))) & 0xff]
              ^((crc<<8)&MASK_CRCDATA);
        *cp++ = 0;
    }
/*
 * 3. CRC covering data
 */
    *cp++ = (crc>>24)&0xff;
    *cp++ = (crc>>16)*0xff;
    *cp++ = (ctc>>8)*0xff;
    *cp++ = crc&0xff;
/*
 * 4. sequence number
 */
    crc = 0;
    crc = crc_trail[((crc>>(SIZE_CRCTRAIL-8))^
          (infoptr->xseq>>16)) & 0xff]
          ^((crc<<8)&MASK_CRCTRAIL);
    *cp++ = (infoptr->xseq>>16) & 0xff;
    crc = crc_trail[((crc>>(SIZE_CRCTRAIL-8))^
          (infoptr->xseq>>8)) & 0xff]
```

APPENDIX II-continued

C Implementation of Transmitter Procedures

Following is a C Program that when run on a general purpose computer implements an apparatus for reclaiming a packet. This routine expects to be called before each frame is sent, and appends the proper control information to the tail of the buffer. The length of the resultant message is returned.

```
          ^((crc<<8)&MASK_CRCTRAIL);
    *cp++ = (infoptr->xseq>>8) & 0xff;
    crc = crc_trail[((crc>>(SIZE_CRCTRAIL-8))^(infoptr->xseq)) & 0xff]
          ^((crc<<8)&MASK_CRCTRAIL);
    *cp++ = (infoptr->xseq) & 0xff;
/*
 * 5. user data length
 */
    crc = crc_trail[((crc>>(SIZE_CRCTRAIL-8)) (len>>8)) & 0xff]
          ^((crc<<8)&MASK_CRCTRAIL);
    *cp++ = (len>>8) & 0xff;
    crc = crc_trail[((crc>>(SIZE_CRCTRAIL-8)) (len)) & 0xff]
          ^((crc<<8)&MASK_CRCTRAIL);
    *cp++ = (len) & 0xff;
/*
 * 6. CRC covering control info
 */
    crc = ((crc<<1) ^ (crc_trail[1] 0x800000)) & 0xffffff;
    *cp++ = (crc>>16)&0xff;
    *cp++ = (crc>>8)&0xff;
    *cp++ = crc&0xff;
    len = ((len+11)&0xfffffff8) + 8;
    return (len);
}
```

APPENDIX III

CRC tables for Software Generation of CRC-DATA

The following tables are used by the programs appearing in Appendix I and II to calculate the value of CRC-DATA.

```
/*
 * CRC 32, 31, 4, 3, 1, 0
 */
#define SIZE_CRCDATA 32
#define SIZE_CHUNK 8
#define MASK_CRCDATA -1
#define MASK_CHUNK 255
static unsigned long crc_data[256] = {
    0x0, 0x8000001b, 0x8000002d, 0x36, 0x80000041, 0x5a, 0x6c, 0x80000077,
    0x80000099, 0x82, 0xb4, 0x800000af, 0xd8, 0x800000c3, 0x800000f5, 0xee,
    0x80000129, 0x132, 0x104, 0x8000011f, 0x168, 0x80000173, 0x80000145, 0x15e,
    0x1b0, 0x800001ab, 0x8000019d, 0x186, 0x800001f1, 0x1ea, 0x1dc, 0X800001c7,
    0x80000249, 0x252, 0x264, 0x8000027f, 0x208, 0x80000213, 0x80000225, 0x23e,
    0x2d0, 0x800002cb, 0x800002fd, 0x2e6, 0x80000291, 0x28a, 0x2bc, 0x800002a7,
    0x360, 0x8000037b, 0x8000034d, 0x356, 0x80000321, 0x33a, 0x30c, 0x80000317,
    0x800003f9, 0x3e2, 0x3d4, 0x800003cf, 0x3b8, 0x800003a3, 0x80000395, 0x38e,
    0x80000489, 0x492, 0x4a4, 0x800004bf, 0x4c8, 0x800004d3, 0x800004e5, 0x4fe,
    0x410, 0x8000040b, 0x8000043d, 0x426, 0x80000451, 0x44a, 0x47c, 0x80000467,
    0x5a0, 0x800005bb, 0x8000058d, 0x596, 0x800005e1, 0x5fa, 0x5cc, 0x800005d7,
    0x80000539, 0x522, 0x514, 0x8000050f, 0x578, 0x80000563, 0x80000555, 0x54e,
    0x6c0, 0x800006db, 0x800006ed, 0x6f6, 0x80000681, 0x69a, 0x6ac, 0x800006b7,
    0x80000659, 0x642, 0x674, 0x8000066f, 0x618, 0x80000603, 0x80000635, 0x62e,
    0x800007e9, 0x7f2, 0x7c4, 0x800007df, 0x7a8, 0x800007b3, 0x80000785, 0x79e,
    0x770, 0x8000076b, 0x8000075d, 0x746, 0x80000731, 0x72a, 0x71c, 0x80000707,
    0x80000909, 0x912, 0x924, 0x8000093f, 0x948, 0x80000953, 0x80000965, 0x97e,
    0x990, 0x8000098b, 0x800009bd, 0x9a6, 0x800009d1, 0x9ca, 0x9fc, 0x800009e7,
    0x820, 0x8000083b, 0x8000080d, 0x816, 0x80000861, 0x87a, 0x84c, 0x80000857,
    0x800008b9, 0x8a2, 0x894, 0x8000088f, 0x8f8, 0x800008e3, 0x800008d5, 0x8ce,
    0xb40, 0x80000b5b, 0x80000b6d, 0xb76, 0x80000b01, 0xb1a, 0xb2c, 0x80000b37,
    0x80000bd9, 0xbc2, 0xbf4, 0x80000bef, 0xb98, 0x80000b83, 0x80000bb5, 0xbae,
    0x80000a69, 0xa72, 0xa44, 0x80000a5f, 0xa28, 0x80000a33, 0x80000a05, 0xa1e,
    0xaf0, 0x80000aeb, 0x80000add, 0xac6, 0x80000ab1, 0xaaa, 0xa9c, 0x80000a87,
    0xd80, 0x80000d9b, 0x80000dad, 0xdb6, 0x80000dc1, 0xdda, 0xdec, 0x80000df7,
    0x80000d19, 0xd02, 0xd34, 0x80000d2f, 0xd58, 0x80000d43, 0x80000d75, 0xd6e,
    0x80000ca9, 0xcb2, 0xc84, 0x80000c9f, 0xce8, 0x80000cf3, 0x80000cc5, 0xcde,
    0xc30, 0x80000c2b, 0x80000c1d, 0xc06, 0x80000c71, 0xc6a, 0xc5c, 0x80000c47,
```

APPENDIX III-continued

CRC tables for Software Generation of CRC-DATA
The following tables are used by the programs appearing in Appendix I and II to calculate the value of CRC-DATA.

0x80000fc9, 0xfd2, 0xfe4, 0x80000fff, 0xf88, 0x80000f93, 0x80000fa5, 0xfbe,
0xf50, 0x80000f4b, 0x80000f7d, 0xf66, 0x80000f11, 0xf0a, 0xf3c, 0x80000f27,
0xee0, 0x80000efb, 0x80000ecd, 0xed6, 0x80000ea1, 0xeba, 0xe8c, 0x80000e97,
0x80000e79, 0xe62, 0xe54, 0x80000e4f, 0xe38, 0x80000e23, 0x80000e15, 0xe0e}

APPENDIX IV

CRC tables for Software Generation of CRC-TRAILER
The following tables are used by the programs appearing in Appendix I and II to calculate the value of CRC-TRAILER.

```
/*
 * CRC 23, 22, 2, 0
 */
#define SIZE_CRCTRAIL 23
#define SIZE_CHUNK 8
#define MASK_CRCTRAIL 8388607
#define MASK_CHUNK 255
static unsigned long crc_trail[256] = {
    0x0, 0x400005, 0x40000f, 0xa, 0x40001b, 0x1e, 0x14, 0x400011,
    0x400033, 0x36, 0x3c, 0x400039, 0x28, 0x40002d, 0x400027, 0x22,
    0x400063, 0x66, 0x6c, 0x400069, 0x78, 0x40007d, 0x400077, 0x72,
    0x50, 0x400055, 0x40005f, 0x5a, 0x40004b, 0x4e, 0x44, 0x400041,
    0x4000c3, 0xc6, 0xcc, 0x4000c9, 0xd8, 0x4000dd, 0x4000d7, 0xd2,
    0xf0, 0x4000f5, 0x4000ff, 0xfa, 0x4000eb, 0xee, 0xe4, 0x4000e1,
    0xa0, 0x4000a5, 0x4000af, 0xaa, 0x4000bb, 0xbe, 0xb4, 0x4000b1,
    0x400093, 0x96, 0x9c, 0x400099, 0x88, 0x40008d, 0x400087, 0x82,
    0x400183, 0x186, 0x18c, 0x400189, 0x198, 0x40019d, 0x400197, 0x192,
    0x1b0, 0x4001b5, 0x4001bf, 0x1ba, 0x4001ab, 0x1ae, 0x1a4, 0x4001a1,
    0x1e0, 0x4001e5, 0x4001ef, 0x1ea, 0x4001fb, 0x1fe, 0x1f4, 0x4001f1,
    0x4001d3, 0x1d6, 0x1dc, 0x4001d9, 0x1c8, 0x4001cd, 0x4001c7, 0x1c2,
    0x140, 0x400145, 0x40014f, 0x14a, 0x40015b, 0x15e, 0x154, 0x400151,
    0x400173, 0x176, 0x17c, 0x400179, 0x168, 0x40016d, 0x400167, 0x162,
    0x400123, 0x126, 0x12c, 0x400129, 0x138, 0x40013d, 0x400137, 0x132,
    0x110, 0x400115, 0x40011f, 0x11a, 0x40010b, 0x10e, 0x104, 0x400101,
    0x400303, 0x306, 0x30c, 0x400309, 0x318, 0x40031d, 0x400317, 0x312,
    0x330, 0x400335, 0x40033f, 0x33a, 0x40032b, 0x32e, 0x324, 0x400321,
    0x360, 0x400365, 0x40036f, 0x36a, 0x40037b, 0x37e, 0x374, 0x400371,
    0x400353, 0x356, 0x35c, 0x400359, 0x348, 0x40034d, 0x400347, 0x342,
    0x3c0, 0x4003c5, 0x4003cf, 0x3ca, 0x4003db, 0x3de, 0x3d4, 0x4003d1,
    0x4003f3, 0x3f6, 0x3fc, 0x4003f9, 0x3e8, 0x4003ed, 0x4003e7, 0x3e2,
    0x4003a3, 0x3a6, 0x3ac, 0x4003a9, 0x3b8, 0x4003bd, 0x4003b7, 0x3b2,
    0x390, 0x400395, 0x40039f, 0x39a, 0x40038b, 0x38e, 0x384, 0x400381,
    0x280, 0x400285, 0x40028f, 0x28a, 0x40029b, 0x29e, 0x294, 0x400291,
    0x4002b3, 0x2b6, 0x2bc, 0x4002b9, 0x2a8, 0x4002ad, 0x4002a7, 0x2a2,
    0x4002e3, 0x2e6, 0x2ec, 0x4002e9, 0x2f8, 0x4002fd, 0x4002f7, 0x2f2,
    0x2d0, 0x4002d5, 0x4002df, 0x2da, 0x4002cb, 0x2ce, 0x2c4, 0x4002c1,
    0x400243, 0x246, 0x24c, 0x400249, 0x258, 0x40025d, 0x400257, 0x252,
    0x270, 0x400275, 0x40027f, 0x27a, 0x40026b, 0x26e, 0x264, 0x400261,
    0x220, 0x400225, 0x40022f, 0x22a, 0x40023b, 0x23e, 0x234, 0x400231,
    0x400213, 0x216, 0x21c, 0x400219, 0x208, 0x40020d, 0x400207, 0x202};
```

APPENDIX V

Generation of CRC tables
The following program was used to calculate the tables appearing in the previous two appendices.

```
#include <stdio.h>
main(argc, argv)
char **argv;
{
    unsigned long crc, poly;
    unsigned long n;
    register int i;
    int v;
```

APPENDIX V-continued

Generation of CRC tables
The following program was used to calculate the tables appearing in the previous two appendices.

```
    register int chunk, size;
    register char *cp;
    if (argc != 4) {
        fprintf(stderr, "Usage: crc_init <exp,exp,exp . . . , 0> <s> <c>\n");
        fprintf(stderr, "         s is crc-size-in-bits\n");
        fprintf(stderr, "         C is check-size-in-bits\n");
        exit(1);
    }
```

APPENDIX V-continued

Generation of CRC tables
The following program was used to calculate the tables appearing in the previous two appendices.

```
    size = atoi(argv[2]);
    chunk = atoi(argv[3]);
    if (chunk > size) }
        fprintf(stderr, "check unit too large\n");
        exit(1);
    }
    cp = argv[1]; poly = 0;
    while (*cp) {
        v = atoi(cp);
        if (v > size) {
            fprintf(stderr, "exponent %d too large (>%d)\n",v,size);
            exit(1);
        }
        if (v != size)
            poly 1 = <<v;
        while (*cp && *cp!=',') cp++;
        while (*cp==',') cp++;
    }
    printf("/*0 CRC %s0/\n", argv[1]);
    printf("#define SIZE_CRC %d \n", size);
    printf("#define SIZE_CHUNK %d \n", chunk);
    printf("#define MASK_CRC %d \n",(1<<size)-1);
    printf("#define MASK_CHUNK %d\n", (1<<chunk)-1);
    printf("static unsigned %s crc_table[%u] = (",
            size>16?"long":"short",1<<chunk);
    for (n=0; n<(1<<chunk); n++) {
        crc = n << (size-chunk);
        if (n > 0) printf(", ");
        if (n % 8 == 0)
            printf("\n          ");
        for (i=0; i<chunk; i++) {
            if (crc & (1<<(size-1)))
                crc = (crc << 1) ^ poly;
            else
                crc <<= 1;
            crc &= (1<<size)-1;
        }
        printf("0x%x", crc);
    }
    printf(");\n\n");
    exit(0);
}
```

What is claimed is:

1. An apparatus for recovering a nonconsecutive packet, said apparatus comprising:

means for forming (217) a candidate frame from at least one cell, such that one of said cells comprises a sequence-identifier, a user-data-length indicator and a first CRC checksum based on said sequence-identifier and said user-data-length indicator;

means for parsing (619, 721) said candidate frame, said candidate frame comprising:

(1) at least a portion of said packet,
   (2) a second CRC checksum based on said packet,
   (3) said sequence identifier,
   (4) said user-data-length indicator, and
   (5) said first CRC checksum;

means for determining (801) if said sequence-identifier is not consecutive;

means for determining (805) if all of said packet is contained within one cell;

means for disregarding said candidate frame if said sequence-identifier is not consecutive and if all of said packet is not contained within one cell; and means for recovering said packet if said sequence-identifier is not consecutive and if all of said packet is contained within one cell.

2. The apparatus of claim 1 further comprising means for checking said packet with a cyclic-redundancy code.

3. The apparatus of claim 2 wherein said means for checking is defined by a generator polynomial equal to $g(x)=x^{32}+x^{31}+x^4+x^3+x+1$.

4. An method for recovering a non-consecutive packet, said method comprising the steps of:

forming a candidate frame from at least one cell, such that one of said cells comprises a sequence-identifier, a user-data-length indicator and a first CRC checksum based on said sequence identifier and said user-data-length indicator;

parsing said candidate frame, said candidate frame comprising:

(1) at least a portion of said packet,
   (2) a second CRC checksum based on said packet,
   (3) said sequence identifier,
   (4) said user-data-length indicator, and
   (5) said first CRC checksum;

determining if said sequence-identifier is not consecutive;

determining if all of said packet is contained within one cell;

disregarding said candidate frame if said sequence-identifier is not consecutive and if all of said packet is not contained within one cell; and recovering said packet if said sequence-identifier is not consecutive and if all of said packet is contained within one cell.

5. The method of claim 4 further comprising the step of checking said packet with a cyclic-redundancy code.

6. The method of claim 5 wherein said step of checking is defined by a generator polynomial equal to $g(x)=x^{32}+x^{31}+x^4+x^3+x+1$.

* * * * *